United States Patent [19]

Suizu

[11] Patent Number: 4,884,676
[45] Date of Patent: Dec. 5, 1989

[54] TRANSFERRING AND SORTING APPARATUS

[75] Inventor: Dairi Suizu, Hyogo, Japan

[73] Assignee: Okura Yusoki Kabushiki Kaisha, Hyogo, Japan

[21] Appl. No.: 223,959

[22] Filed: Jul. 25, 1988

[30] Foreign Application Priority Data

Aug. 5, 1987 [JP] Japan .................... 62-195737

[51] Int. Cl.⁴ ............................ B65G 37/00
[52] U.S. Cl. .................... 198/365; 198/802
[58] Field of Search ................. 198/365, 802

[56] References Cited

U.S. PATENT DOCUMENTS

| | | | |
|---|---|---|---|
| 3,912,071 | 10/1975 | Nielsen | 198/365 |
| 4,081,071 | 3/1978 | Nielsen | 198/365 |
| 4,712,965 | 12/1987 | Lanziani | 198/365 X |
| 4,781,281 | 11/1988 | Lanziani | 198/802 X |

FOREIGN PATENT DOCUMENTS 0040318 3/1985 Japan ..................... 198/365

Primary Examiner—Robert J. Spar
Assistant Examiner—James R. Bidwell
Attorney, Agent, or Firm—James E. Nilles; Donald C. McGaughey

[57] ABSTRACT

A transferring and sorting apparatus wherein an endless sorting belt is provided in a transfer body moving along a transfer passage, which sorting belt is capable of transferring articles in the direction crossing the direction of movement of the transfer body. This sorting belt is placed over a driving pulley, which is connected via a transmission device to a friction wheel provided below the transfer body. A friction member adapted to be moved toward and away from the friction wheel is provided in predetermined positions on the transfer passage. When the friction member is moved to engage the friction wheel, the turning movement of the friction wheel rolled with the friction member is transmitted to the driving pulley to drive the sorting belt toward one side portion of the transfer passage.

2 Claims, 7 Drawing Sheets

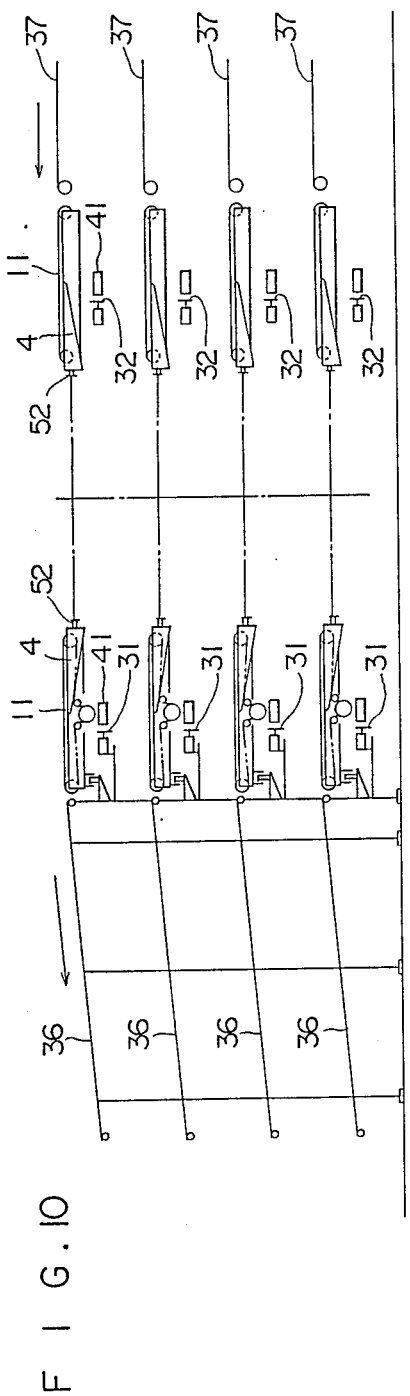
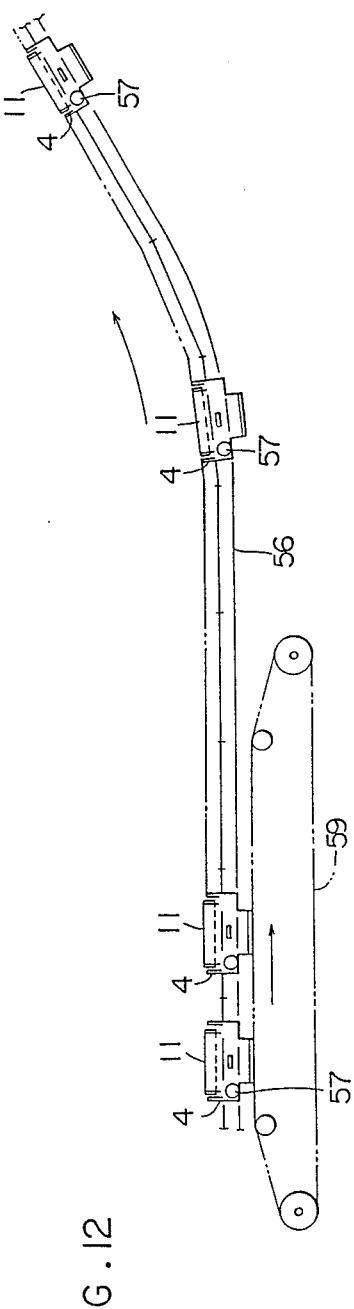
FIG. 10
FIG. 12

TRANSFERRING AND SORTING APPARATUS

BACKGROUND OF THE INVENTION

1. Field of the Invention

This invention relates to a transferring and sorting apparatus adapted to sort articles by sending the articles selectively in the lateral direction of a transfer passage while transferring the articles.

2. Description of the Prior Art

The conventional transferring and sorting apparatuses of this kind include an apparatus of a system in which the articles on a conveyor constituting a transfer passage are forced out sideways by a scraper or a pusher, and an apparatus of a system in which a carriage or a slat running along a transfer passage is inclined sideways to drop sideways the articles from the carriage or slat by utilizing the gravity of the articles. However, the types of articles to be sorted by these apparatuses are limited, i.e., small articles, bulk articles, light articles, thin articles and articles having irregular bottom surfaces, which cannot be transferred by any means but a belt conveyor, cannot be sorted properly by these apparatuses.

The apparatuses which can be used for transferring and sorting such articles include the apparatus disclosed in Japanese Patent Laid-open No. 98580/1973.

In this transferring and sorting apparatus, an endless sorting belt (cloth belt) is provided in a transfer body (chassis structure), which is moved along a transfer passage (C rails), in such a manner that the sorting belt can transfer articles in the direction which crosses the direction of movement of the transfer body. This sorting belt is passed around driving pulleys (rollers), which are connected via a transmission gear to a friction wheel (pinion or pulley) provided under the transfer body so that the friction wheel can be laterally turned. Left and right friction members (racks, friction racks, V-belts, or rack units) and a guide unit (guide rod or guide member) which are relative to the friction wheel are provided in predetermined positions on the transfer passage. The friction wheel of the transfer body in motion is guided laterally by the guide unit and engaged with one of the two friction members, whereby the turning movement of the friction wheel, which is rolled with respect to this friction member, is transmitted to the driving pulleys to turn the driving pulleys selectively in the forward or reverse direction depending on a friction member selected. Consequently, the sorting belt is driven selectively toward one or the other side portion of the transfer passage.

However, the transferring and sorting apparatus disclosed in the above-mentioned publication, which is provided with the friction wheel (pinion or pulley) under the transfer body (chassis structure) so that the friction wheel can be turned laterally like a pendulum, is constructed in such a manner that, when an article sorting operation is started, the friction wheel is guided by the guide unit (guide rod or guide member) on the side of the transfer passage (C rails) toward one of the two friction members (racks, friction racks, V-belts, or rack units) fixed to the transfer passage, so as to be engaged therewith. Therefore, it is necessary that the friction wheel be set in the intermediate neutral position during a regular operation of the apparatus. This causes the construction of a support structure for the friction wheel to be complicated, and the numbers of parts and assembling steps to increase. Moreover, it is difficult to reliably engage the friction wheel with the friction member and maintain this engagement. Consequently, the operation of the apparatus tends to be unreliable, and noise occurs while the pendulum-like friction wheel is guided laterally. Since the guide unit is always in the position in front of the sorting position in which the friction members are provided, the distance between the longitudinally adjacent sorting positions increases.

SUMMARY OF THE INVENTION

An object of the present invention is to obtain a transferring and sorting apparatus consisting of a sorting belt which is provided on a transfer body moving on a transfer passage, and which is adapted to transfer articles in the direction crossing the direction of movement of the transfer body, the apparatus being capable of solving the construction and operation problems with the conventional apparatus of this kind and noise problem therewith and reducing the distance between the longitudinally adjacent sorting positions.

In the transferring and sorting apparatus according to the present invention, an endless sorting belt is provided in a transfer body moving along a transfer passage, which sorting belt is capable of transferring articles in the direction crossing the direction of movement of the transfer body. This sorting belt is placed over a driving pulley, which is connected via a transmission gear to friction wheels provided below the transfer body. A pair of friction members adapted to be moved toward and away from the friction wheels are provided in predetermined positions on the transfer passage. One of the two friction members is moved selectively toward the friction wheels to engage the former with one of the latter, and the turning movement of the friction wheel rolled with respect to the selected friction member is transmitted to the driving pulley via the transmission gear. Thus, the driving pulley is turned selectively in the forward or reverse direction depending on the friction member selected to drive the sorting belt selectively toward one side portion of the transfer passage or the other side portion thereof.

The transferring and sorting apparatus according to the present invention is constructed so that, when a sorting operation is started, the friction members on the transfer passage are moved toward the friction wheels supported fixedly in the lower portion of the transfer body, to engage the friction members with the friction wheels. Therefore, a support structure for the friction wheels can be formed simply, and the numbers of parts and assembling man-hours can be minimized. Moreover, the friction wheels and friction members are engaged with each other simply and reliably by merely pressing the latter against the former, and this engagement is maintained as long as needed. This enables the apparatus to be operated reliably and stably, and the occurrence of noise to be minimized. Since it is unnecessary to provide any special means in front of or behind the friction members in a sorting position, the distance between the longitudinally adjacent sorting positions can be reduced.

Some other objects and characteristic features of the present invention will now be described with reference to the drawings.

BRIEF DESCRIPTION OF THE DRAWINGS

The accompanying drawings show the embodiments of the transferring and sorting apparatus according to the present invention, wherein:

FIGS. 9 and 10 are a plan and a side elevation, respectively, showing an example of arrangement to which the present invention is applied; and FIGS. 11 and 12 are a plan and a side elevation, respectively, showing another example of arrangement to which the present invention is applied.

DESCRIPTION OF THE PREFERRED EMBODIMENTS

FIGS. 1-5 show a first embodiment of the present invention.

Figure 1:
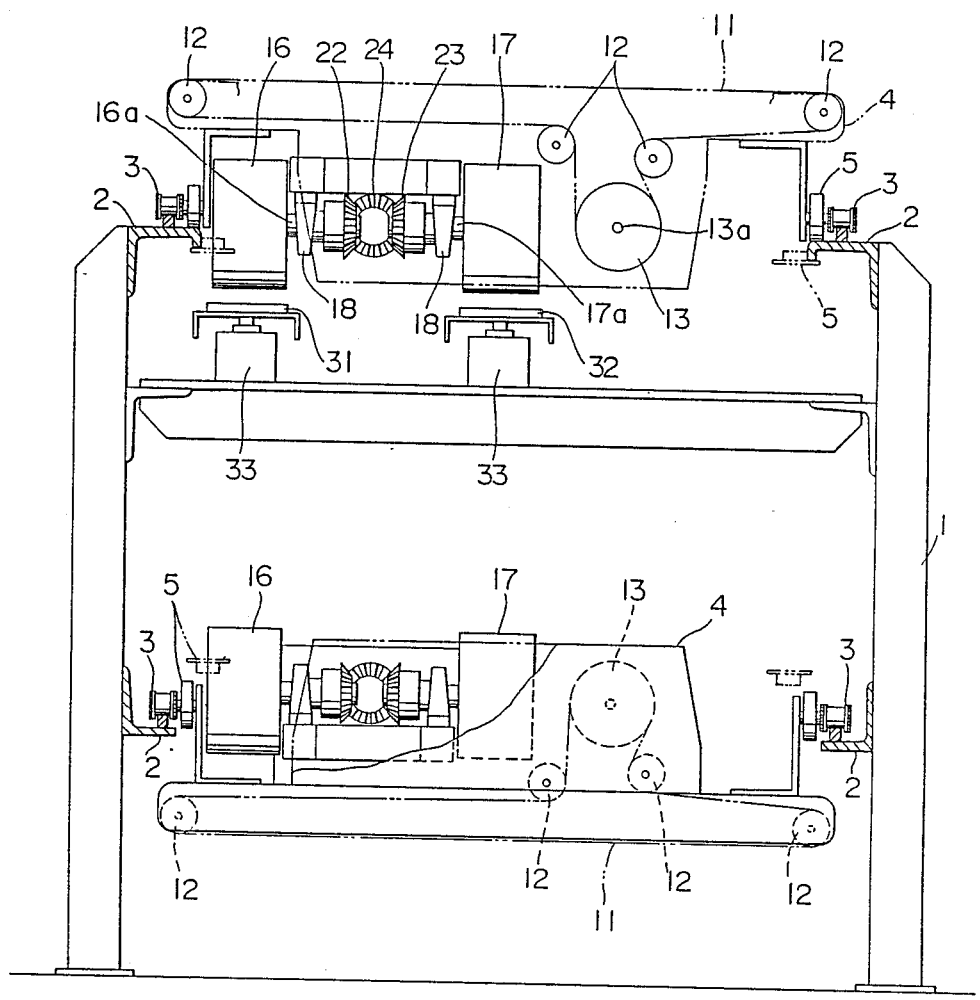
FIGS. 1, 2 and 3 are a front elevation, a plan and a side elevation, respectively, of a principal portion of a first embodiment.
Figure 4:
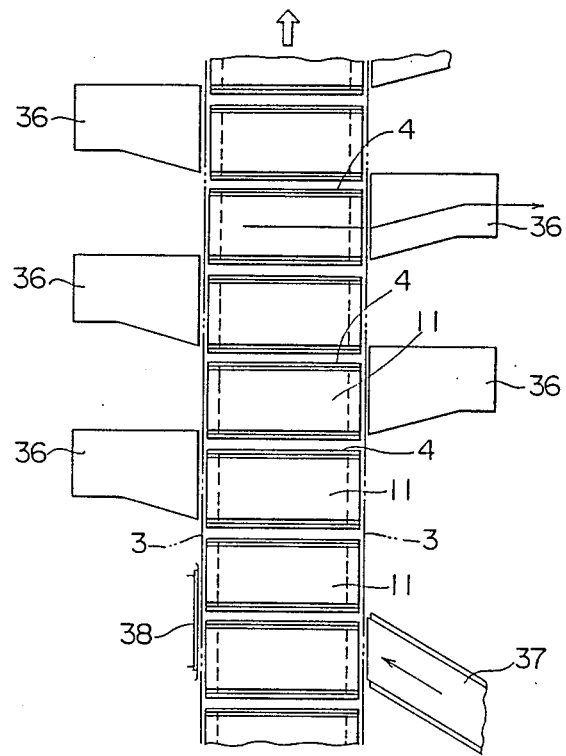
FIGS. 4 and 5 are a plan and a front elevation, respectively, showing the arrangement of the principal portion.

Referring to FIG. 1, reference numeral 1 denotes a fixed frame, and rails 2 are provided at the upper and lower portions of both sides of the fixed frame 1 so as to extend horizontally in parallel with each other. Left and right paired sprocket wheels are provided at both of the longitudinal end portions of these four rails 2, and left and right endless chains 3 are passed around the longitudinally opposed sprocket wheels among these left and right paired sprocket wheels. The upper and lower moving portions of these left and right chains 3 are supported on the four rails 2, and adapted to be turned synchronously by driving means (not shown). As shown in FIG. 4 as well, a plurality of moving frames 4 as transfer bodies are provided between the left and right chains 3. These frames are moved along the upper rails 2, which constitute a transfer passage, in one direction on the inner side of the upper portion of the fixed frame 1 in accordance with the turning of the left and right chains 3, and they are then moved in an inverted state along the lower rails 2, which constitute a return passage, in the other direction on the inner side of the lower portion of the fixed frame 1, the moving frames 4 being thus circulated. Reference numeral 5 denotes rollers rotatably supported on the moving frames 4, and engaged with the rails 2 so as to support the frames 4 thereon.

Figure 2:
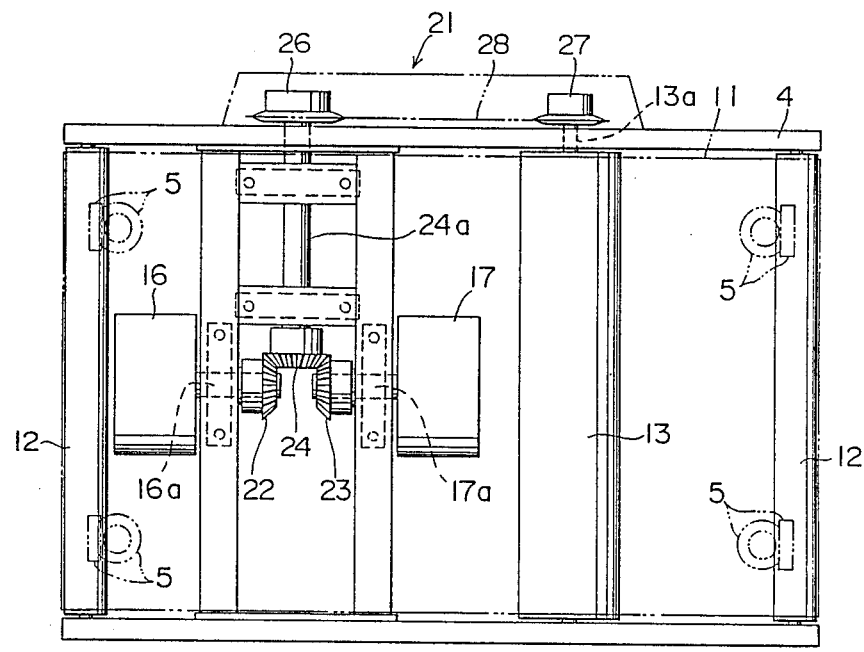
Figure 3:
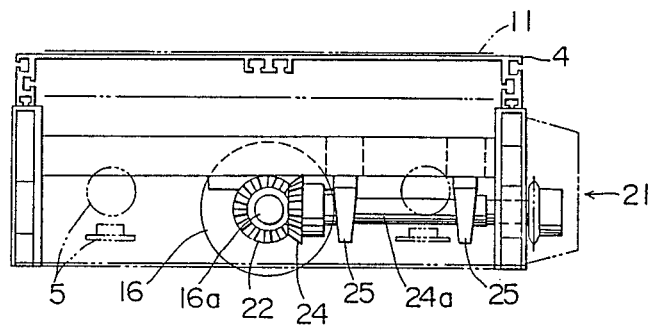

As shown in FIGS. 1-3, endless sorting belts 11 extend over the moving frames 4, and each of the sorting belts 11 is passed around a plurality of guide pulleys 12 and a driving pulley 13 so that it can transfer articles in the direction which is at right angles to the direction of movement of the frames 4. The sorting belt 11 is passed in a large curve, especially, around the driving pulley 13 provided under the moving frame 4.

Under each of the moving frames 4, left and right friction wheels 16, 17 are provided on the same shaft via bearings 18 so that the friction wheels 16, 17 can be turned in the direction of movement of the frames 4. These two friction wheels 16, 17 and driving pulley 13 are connected together via a transmission means 21.

The transmission means 21 is constructed as follows: The driving pulley 13 and its shaft 13a, and the friction wheels 16, 17 and their shafts 16a, 17a are combined unitarily, and bevel gears 22, 23 are mounted on the opposed end portions of the shafts 16a, 17a of the friction wheels 16, 17. A bevel gear 24 meshed with these two bevel gears 22, 23 is supported on the moving frame 4 via a shaft 24a joined unitarily to the bevel gear 24, as well as bearings 25, and the shafts 13a, 24a are connected together via a pair of sprockets 26, 27 and an endless chain 28. When either of the friction wheels 16, 17 is turned, the driving pulley 13 is turned to move the sorting belt 11. When one of the friction wheels 16, 17 is turned in a direction of the transfer body movements, the driving pull=y 13 and sorting belt 11 are turned in the one side direction, and, when the other friction wheel is turned in the same direction, the driving pulley 13 and sorting belt 11 are turned in the other side direction.

Friction members 31, 32 are provided on a plurality of portions of the fixed frame 1 so that the friction members can be moved vertically by air cylinders 33. These friction members 31, 32 are adapted to be moved toward and away from the friction wheels 16, 17 in the frame 4 moving along the upper rails 2. When the friction members 31, 32 on the fixed frame 1 are moved up by the air cylinders 33 during the movement of the frame 4 to bring the friction members 31, 32 into contact with the corresponding friction wheels 16, 17 in the moving frame 4, the friction wheels 16, 17 are turned with respect to the friction members 31, 32 which have engaged the same, whereby the sorting belt 11 can be moved. Moreover, when one of the friction members 31, 32 is engaged with the relative friction wheel 16 or 17, the sorting belt 11 can be moved in a forward direction, and, when the other friction member is engaged with the relative friction wheel, the sorting belt 11 can be moved in the reverse direction.

Each of the friction members 31, 32 has a length in the direction of movement of the frame 4, which is large enough to enable the sorting belt 11 to be moved a distance longer than at least the length of the upper portion of the sorting belt 11, i.e. the distance between the guide pulleys 12 at both of the upper outer sides.

Figure 5:
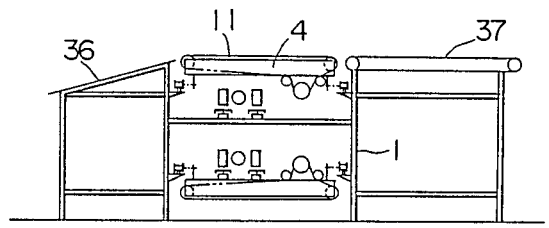

In this embodiment, the friction members 31, 32 are provided at a plurality of positions in the direction of movement of the frame 4, and a carry-out chute 36, which inclines so that the height thereof decreases gradually in the outward direction, is provided in a position corresponding to each of the friction members 31, 32 at the outer side of the sorting belt 11 moved by the friction members 31, 32, and which is on an imaginary straight extension line aligned with the axis of the sorting belt 11, as shown in FIGS. 4 and 5. A sorting unit is thus formed. A carry-in conveyor 37 is provided on the upstream side of the sorting unit with respect to the direction of movement of the frame 4, and a stopper 38 is provided on the opposite side of the carry-in conveyor 37 with the moving frame 4 positioned therebetween.

In such a structure, articles (not shown) are supplied via the carry-in conveyor 37 onto the sorting belt 11, which extends over the frame 4 being moved by the endless chains 3 like a slat conveyor. When the articles have been transferred to the sorting unit by the moving frame 4, one of the friction members 31, 32 relative to a predetermined carry-out chute 36 is moved up and engaged with one of the friction wheels 16, 17 to drive the article-supporting sorting belt 11 toward the carry-out chute 36 and send out the articles onto the same chute 36.

Figure 6:
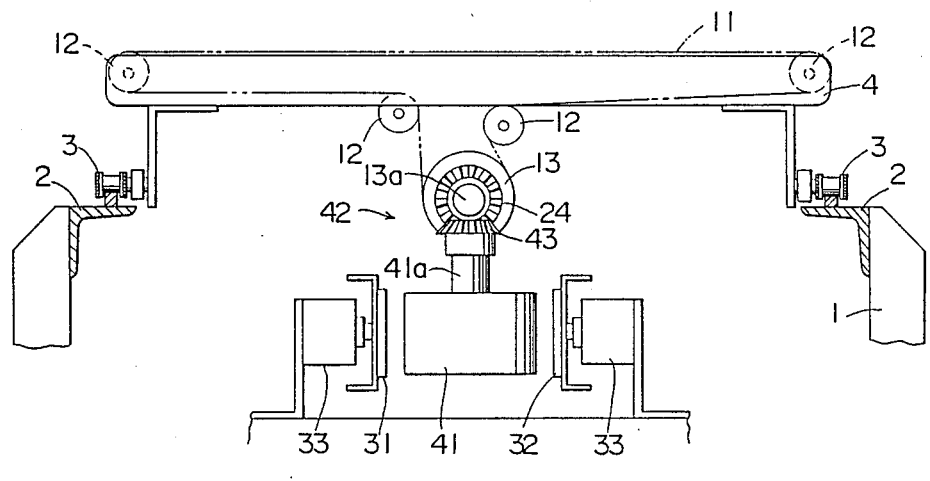
FIGS. 6 and 7 are a front elevation and a plan, respectively, of a principal portion of a second embodiment.
Figure 7:
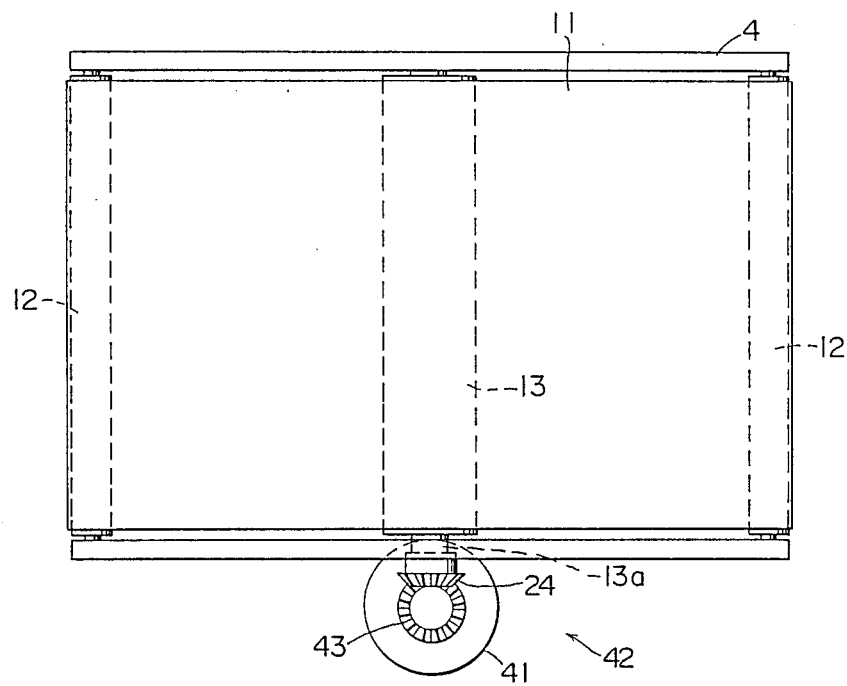

FIGS. 6 and 7 show a second embodiment.

This embodiment will now be described with respect to only the portions thereof that are different from the portions of the first embodiment. The portions of the second embodiment which are the same as the corresponding portions of the first embodiment are designated by the same reference numerals, and the descriptions of these portions of the second embodiment are omitted.

In this embodiment, a single friction wheel 41 is supported on a moving frame 4 via a vertical shaft 41a and bearings (not shown), and this friction wheel 41 and a driving pulley 13 are joined to each other via a transmission mechanism 42. A pair of friction members 31, 32 on a fixed frame 1 are provided so that the friction members can be moved toward and away from both side portions of the friction wheel 41, and the transmission mechanism 42 consists of the friction wheel 41 and its shaft 41a combined unitarily therewith, a bevel gear 43 mounted on the end portion of the shaft 41a, and a bevel gear 24 meshed with the bevel gear 43 and mounted on a shaft 13a of the driving pulley 13. When one of the friction members 31, 32 is engaged with the friction wheel 41, the friction wheel 41 is turned in a forward direction, and, when the other friction member is engaged with the friction wheel 41, the friction wheel 41 is turned in the reverse direction. The driving pulley 13 and sorting belt 11 are turned in a direction in accordance with the direction in which the friction wheel 41 is turned.

Figure 8:
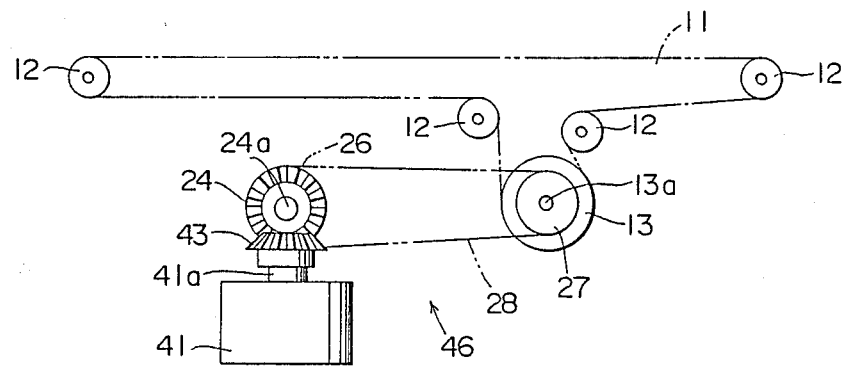
FIG. 8 is a side elevation of a principal portion of a modified example of the second embodiment.

FIG. 8 shows a modified example of the second embodiment. In this modified example, the same type of transmission mechanism 46 as in the first embodiment is used to join a friction wheel 41 and a driving pulley 13 to each other, and the friction wheel 41 does not project from a moving frame 4.

In the second embodiment (including its modified example), the friction members 31, 32 and air cylinders 33 are positioned on the sides of the friction wheel 41. Accordingly, it is recommended that this embodiment be applied to a vertical multi-stage transferring and sorting apparatus.

Figure 9:
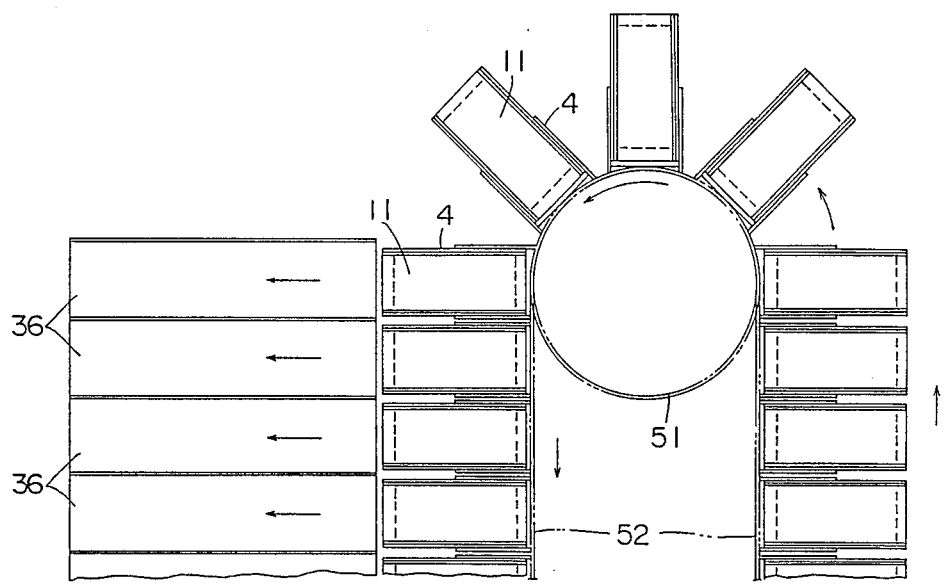

The transferring and sorting apparatus shown in FIGS. 9 and 10 is called a carousel type transferring and sorting apparatus, in which an endless chain 52 is set horizontally over a pair of sprockets 51, the frames 4 being moved in accordance with the horizontal turning of this chain 52. Articles (not shown) are supplied via a carry-in conveyor 37 onto a sorting belt 11 on a moving frame 4 in motion. When the articles have been transferred by the movement of the frame 4 to a sorting unit provided with a plurality of carry-out chutes 36, the article-supporting sorting belt 11 is driven toward a predetermined carry-out chute 36 to which the sorting belt 11 is opposed, to send out the articles onto the same carry-out chute 36.

Figure 11:
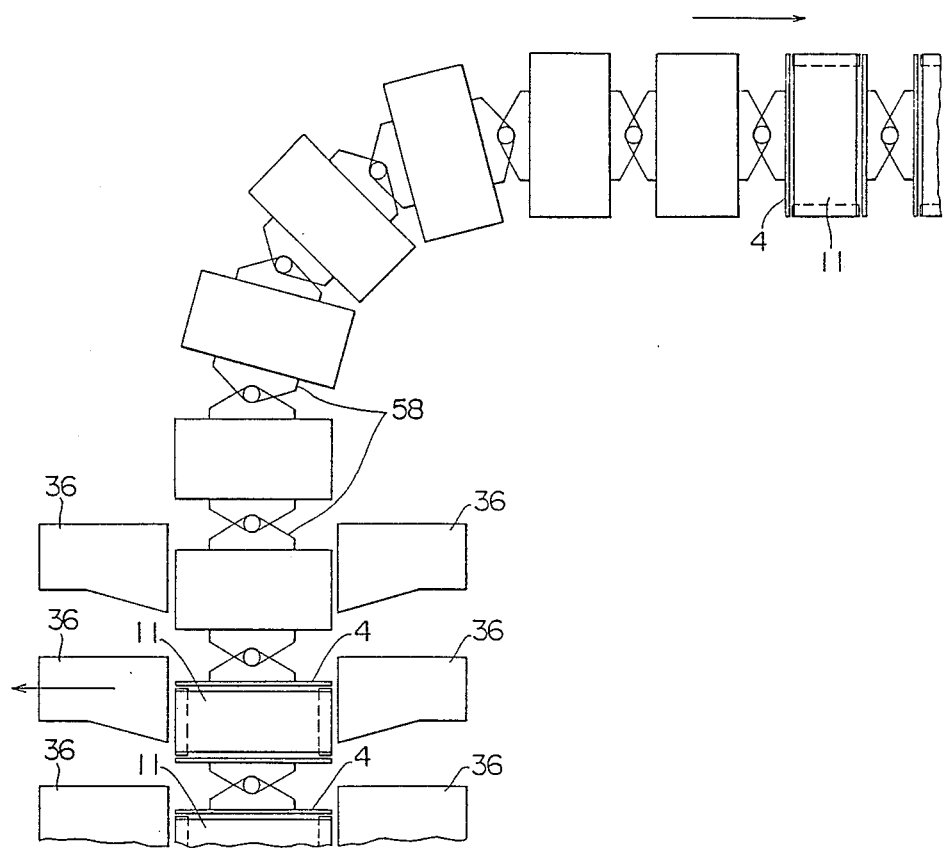

FIGS. 11 and 12 show another example to which the transferring and sorting apparatus according to the present invention is applied. In this example, a plurality of frames 4 are movably engaged via wheels 57 with a three-dimensional track 56 formed endlessly and constituting a transfer passage. These moving frames 4 are connected endlessly on the three-dimensional track via connecting members 58, and a caterpillar type driving belt 59 provided at a part of the track 56 is in contact with the lower portion of the frames 4. When this driving be 59 is moved, the frames 4 are moved three-dimensionally along the track 56. Articles (not shown) are supplied via a carry-in conveyor (not shown) onto a sorting belt 11 on the frame 4 in motion. When these articles have been transferred by the movement of the frame 4 to a sorting unit provided with a plurality of carry-out chutes 36, the article-supporting sorting belt 11 is driven toward a predetermined carry-out chute 36 to which the sorting belt 11 is opposed, to send out the articles onto the same carry-out chute 36.

When articles (not shown) are supplied from the carry-in conveyor 37 onto the sorting belt 11 in each of the embodiments described above, the sorting belt 11 can be driven in a direction in which the articles are allowed to be transferred onto the belt.

According to the present invention described above, articles are placed on the sorting belt in the transfer body, and the transfer body is moved to carry the articles to a predetermined position, in which the sorting belt in the transfer body is driven in one direction or in the opposite direction, the articles which have been transferred to this position being then nloaded. During such an article transferring and sorting operation, the sorting belt is driven such that a friction member on the side of the transfer passage is moved toward the friction wheel, which is supported fixedly under the transfer body, to be engaged therewith. This enables the construction of the friction wheel supporting structure to be simplified, and the numbers of the parts and assembling man-hours to be reduced greatly. Moreover, the friction wheel and friction members are engaged simply and reliably by merely pressing the latter against the former, and this engagement is maintained as long as needed. Accordingly, the transferring and sorting operation is carried out reliably and stably, and noise rarely occurs. Since it is unnecessary to provide special means in front of or behind a sorting position, the distance between longitudinally adjacent sorting positions can be reduced.

What is claimed is:

1. A transferring and sorting apparatus comprising a transfer body moving along a transfer passage, an endless sorting belt which is capable of running in a direction crossing a direction of movement of the transfer body, a driving pulley for driving the sorting belt, friction wheels provided below the transfer body and connected via transmission means to the driving pulley, and a pair of friction members provided in predetermined positions on the transfer passage and adapted to be moved toward and away from the friction wheels, wherein one of the two friction members is moved selectively toward the friction wheels to engage the former with one of the latter, and the turning movement of the friction wheel rolled with respect to the friction member is transmitted to the driving pulley via the transmission means, so that the driving pulley is turned selectively in the forward or reverse direction depending on the friction member selected to drive the sorting belt selectively toward one side portion of the transfer passage or the other side portion thereof.

2. The transferring and sorting apparatus according to claim 1, wherein said transfer body consists of a plurality of frames connected to an endless chain and said endless sorting belt is mounted so as to extend over each of the frames.

* * * * *